(12) United States Patent
Ramanzin

(10) Patent No.: US 7,702,994 B2
(45) Date of Patent: Apr. 20, 2010

(54) METHOD OF DETERMINING A CORRUPTION INDICATION OF A SEQUENCE OF ENCODED DATA FRAMES

(75) Inventor: Yves Ramanzin, Boulogne-Billancourt (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 11/719,537

(22) PCT Filed: Nov. 9, 2005

(86) PCT No.: PCT/IB2005/053688

§ 371 (c)(1),
(2), (4) Date: Apr. 24, 2009

(87) PCT Pub. No.: WO2006/054206

PCT Pub. Date: May 26, 2006

(65) Prior Publication Data

US 2009/0228772 A1    Sep. 10, 2009

(30) Foreign Application Priority Data

Nov. 16, 2004  (EP) ................................ 04300793

(51) Int. Cl.
*G06F 11/10* (2006.01)
*H03M 13/00* (2006.01)
(52) U.S. Cl. .................... 714/807; 714/747; 714/723
(58) Field of Classification Search ............... 714/723, 714/747, 807
See application file for complete search history.

(56) References Cited

U.S. PATENT DOCUMENTS

| | | | | |
|---|---|---|---|---|
| 5,212,549 | A | * | 5/1993 | Ng et al. ............... 375/240.15 |
| 7,451,355 | B1 | * | 11/2008 | Coatney et al. ............ 714/42 |
| 2005/0071723 | A1 | * | 3/2005 | Luick ........................ 714/747 |

FOREIGN PATENT DOCUMENTS

| | | |
|---|---|---|
| EP | 1 120 966 A2 | 8/2001 |
| WO | 2004/066096 A | 8/2004 |

OTHER PUBLICATIONS

Fukunaga, S. et al. "Error Resilient Video Coding by Dynamic Replacing of Reference Pictures", IEEE Global Telecommunications Conference 1996, vol. 3, pp. 1503-1508 (1996).
Minutes of Oral Proceedings in EP patent appln. 05 798 808.1 (May 25, 2009).
Decision in EP Patent appin. 05 798 808.1 (May 25, 2009).

* cited by examiner

*Primary Examiner*—Guy J Lamarre

(57) ABSTRACT

The present invention relates to a method of determining a corruption indication of a sequence (100) of encoded data frames distributed over a network, said data frames being encoded according to a predictive block-based encoding technique. Said method comprises the steps of: —decoding the sequence of encoded data frames so as to obtain a sequence of decoded data frames (200), —building a reliability map (210) including binary values based on the decoding step, a binary value being associated with a decoded data item in such a way that the binary value is equal to a first value (1) if its associated data item has not been decoded due to corruption or if said associated data item is predicted with reference to a reference data item that has not been decoded due to corruption, and to a second value (0) otherwise, —computing a corruption metric based on the binary values.

5 Claims, 2 Drawing Sheets

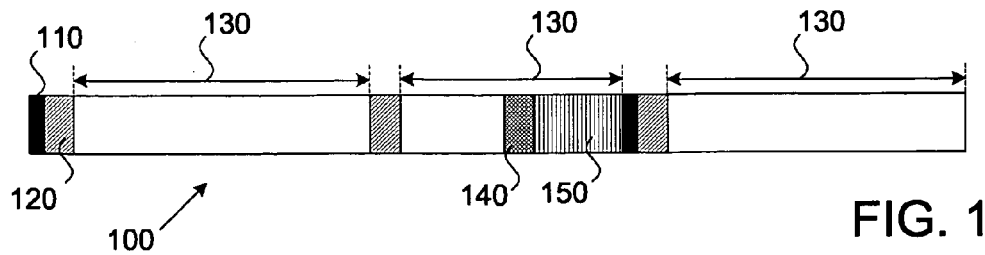
FIG. 1
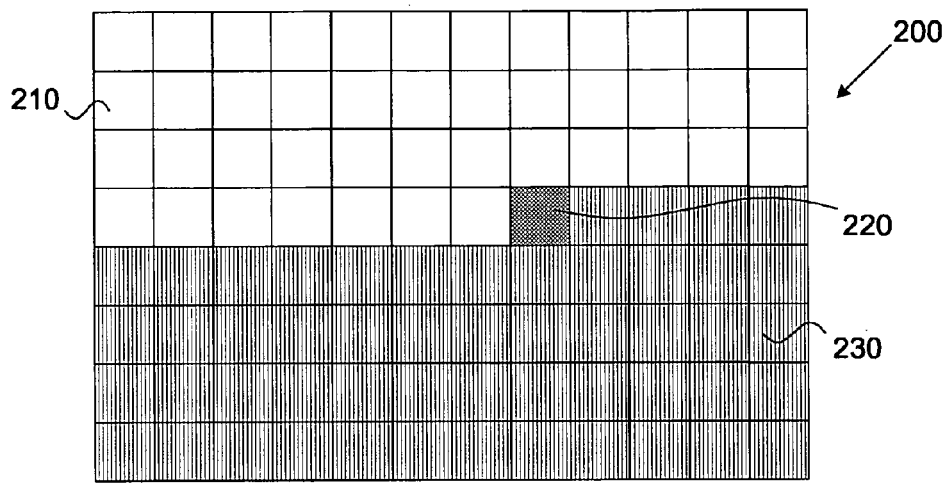
FIG. 2A
FIG. 2B

METHOD OF DETERMINING A CORRUPTION INDICATION OF A SEQUENCE OF ENCODED DATA FRAMES

FIELD OF THE INVENTION

The present invention relates to a method of determining a corruption indication of a sequence of encoded data frames distributed over a network, said frames being encoded according to a predictive block-based encoding technique.

It may be used, for example, in mobile phones in order to monitor the degree of corruption of a received data content.

BACKGROUND OF THE INVENTION

3GPP specifies services to allow distributing multimedia content over mobile networks. The document TS 26.243 defines the PSS (for Packet Switched Streaming) service. This service consists in streaming continuous media such as audio and video using RTP (for Real-time Transport Protocol) over UDP (for User Datagram Protocol) as the transport layer. This transport protocol is not reliable: it does not guarantee that the client will get all the data sent by the server. Therefore the content presented to the end-user may be corrupted and it is important for the service provider to monitor the degree of corruption in order to implement a customer-care policy or to adapt its billing strategy.

In 3GPP PSS Release 6, some metrics are defined in order to report to the service provider the quality of experience (QoE) of the end-user. One of this metric is the corruption duration of a media. For non-predictive coding format, the measure is straightforward since a packet loss exactly results in the corruption of one media access unit (i.e. one elementary element of the media). On the contrary, for predictive coding scheme there is no direct mapping between a packet loss and the corruption effect. Errors propagate across the decoded sequence and it is not easy to know accurately when the decoded media is no longer corrupted. This is particularly true for conventional video coding scheme (MPEG, H263, H264).

SUMMARY OF THE INVENTION

It is an object of the invention to propose a method of determining a corruption indication of a sequence of encoded data frames distributed over a network, which is an alternative to the prior art metrics.

To this end, the method of determining a corruption indication of a sequence of encoded data frames distributed over a network in accordance with the invention is characterized in that it comprises:

- decoding the sequence of encoded data frames so as to obtain a sequence of decoded data frames,
- building a reliability map including binary values based on the decoding step, a binary value being associated with a decoded data item in such a way that the binary value is equal to a first value if its associated data item has not been decoded due to corruption or if said associated data item is predicted with reference to a reference data item that has not been decoded due to corruption, and to a second value otherwise,
- computing a corruption metric based on the binary values.

Thus, the present invention proposes a new metric for indicating the degree of corruption of a sequence of encoded data frames distributed over a network but it also proposes a direct implementation of said metric. In addition, the method in accordance with the invention allows to exactly measure at a given instant the number of corrupted data items within a sequence of decoded data frames at a limited computational cost.

According to an embodiment of the invention, the corruption metric is the ratio of binary values having the first value over the total number of binary values.

The present invention also relates to a device for implementing the method of determining a corruption indication of a sequence of encoded data frames distributed over a network, to a mobile apparatus including such a device, and to a computer program product comprising program instructions for implementing this method.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein:

FIG. 1 shows a portion of a sequence of encoded video frames,

FIG. 2A illustrates the structure of a decoded video frame containing data which have been corrupted during their transmission through the network, FIG. 2B illustrates the reliability map in accordance with the invention, this map corresponding to the decoded video frame of FIG. 2A.

DETAILED DESCRIPTION OF THE INVENTION

Figure 3:
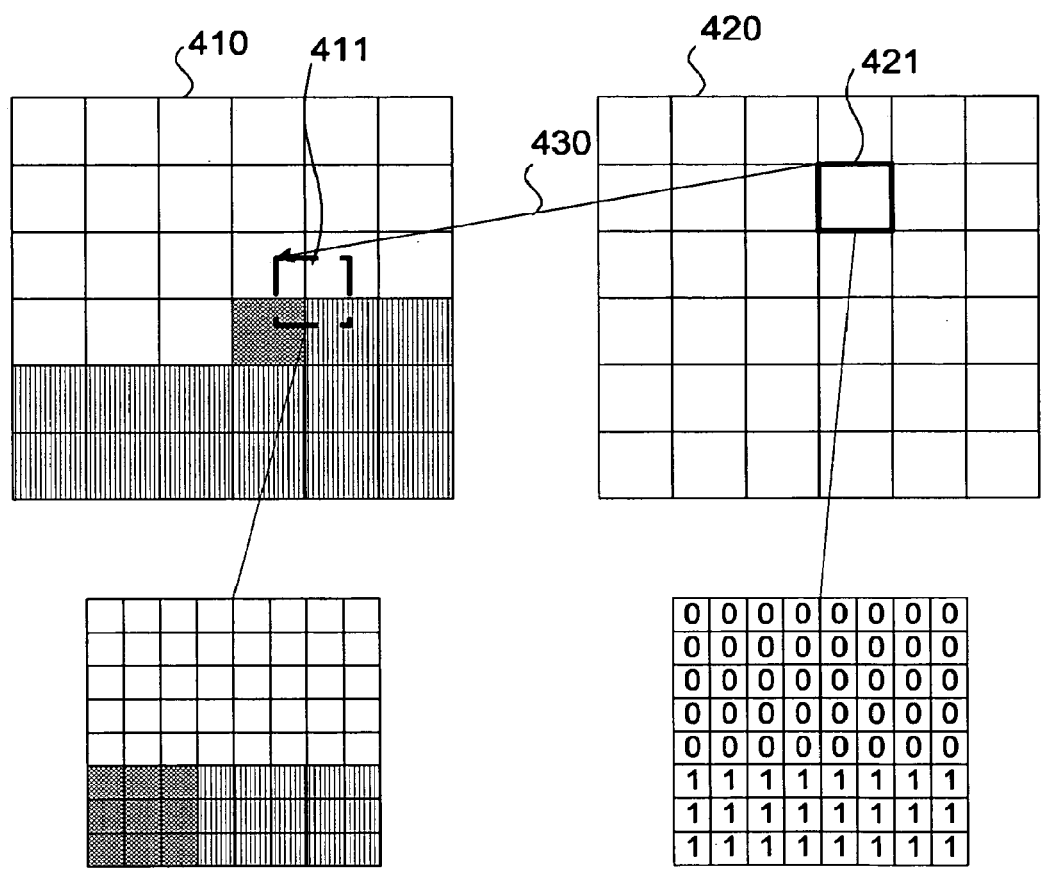
FIG. 3 illustrates the way the reliability map is built in the case of a predicted data block.

The present invention relates to a method of determining a corruption indication of a sequence of encoded data frames. The following description is done in the case of video frames encoded according to the MPEG video compression scheme. However, it will be apparent to a skilled person that these frames could be audio or text frames provided that they are encoded according to a predictive block-based encoding technique. It will also be apparent to those skilled in the art that he invention may be used in any video player using other video compression scheme, such as H261, H263 or H264, but also RealVideo or Microsoft VC-9, and receiving the sequence of frames over an error prone transport system.

The principle of the invention is based on the maintenance throughout the decoding process of a reliability map of the data items of the decoded data frames, namely pixels in the case of decoded video frames.

Referring to FIG. 1, a portion 100 of a sequence of encoded video frames is represented. The sequence of encoded video frames includes, for example, resynchronization markers 110, frame headers 120 and frame data 130. When some data 140 are lost in such a sequence, the immediate effect is that the decoding process is stopped until a resynchronization marker 110 is found. Depending on the decoder, it can result in the loss of one or several data blocks 150 corresponding, for example, to the end of the current video frame or even to several video frames.

Turning to FIG. 2A, the structure of a decoded video frame is depicted. Said video frame is divided into data blocks. During the transmission of the sequence of encoded video frames through the network, data have been corrupted. A non-corrupted data block 210 can be decoded and displayed. If an encoded data block contains corrupted data, it cannot be decoded and a void data block 220 containing for example black pixels is displayed. The data blocks following this corrupted data block 220 can also not be decoded and void blocks 230 are thus displayed. The decoding process resumes when a resynchronization marker is found, as explained before. For example, in the case of FIG. 2A, the next resynchronization marker is the next frame start code.

Turning now to FIG. 2B, a reliability map 250 corresponding to the decoded frame of FIG. 2A is shown. This reliability map has the same size as the decoded video frame and comprises pixels which can have two different values: '0' if the pixel is reliable, '1' otherwise. At the beginning of the decoding process, all pixels of the reliability map are set to 0, namely they are considered as reliable. The reliability map remains unchanged until a loss is detected. When a loss occurs, the reliability map is updated as follows: every not decoded pixel is set to 1. These not decoded pixels can be the entire video frame if several video frames have been lost or only the pixels corresponding to the lost data block(s).

Then, each time a current video frame is decoded, a current reliability map is built using the decoding information. This is illustrated in FIG. 3 in the case of a predicted data block. For each predicted data block, that is a data block 421 in a current frame 420 which is predicted with reference to a reference data block 411 in a reference frame 410, the reliability values of the pixels of this data block 421 are obtained by applying the corresponding motion vector 430 to the current reliability map (i.e. by applying the motion compensation process to the current data block according to a principle know to those skilled in the art): if the reference pixel in the reference frame is reliable then the corresponding current pixel is reliable ('0' value) otherwise it is not reliable ('1' value). For each intra coded data block, that is a data block which is predicted without reference to another data block, all the reliability values are set to '0' if this intra coded data block has been decoded and are set to '1' otherwise.

Strictly speaking, a video frame is corrupted as long as at least one pixel of the reliability map associated with this video frame is not null. However, the method described above provides reliability information on a pixel basis. It is therefore possible to define a gradual metric based, for example, on the percentage of the corrupted pixels. This metric can be provided on a video frame basis, on a group of video frames basis or for the whole sequence of video frames.

A particular application field for this invention is mobile multimedia. Thanks to the method in accordance with the invention, telecommunications operators providing multimedia-streaming services can monitor what their end-users actually experience during a streaming session. Depending on the degree of corruption given by the metric, the telecommunications operators can implement a customer-care policy or adapt their billing strategy. They can also take corrective measures. For example, the encoder at the telecommunications operator side may encode data blocks following a current data block without reference to a reference data block (i.e. may perform intra coding) in response to the metric value.

It should be noted that the above-mentioned embodiment illustrates rather than limits the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of determining a corruption indication of a sequence of encoded data frames distributed over a network, said data frames being encoded according to a predictive block-based encoding technique, said method comprising the steps of: decoding the sequence of encoded data frames so as to obtain a sequence of decoded data frames, building a reliability map including binary values based on the decoding step, a binary value being associated with a decoded data item in such a way that the binary value is equal to a first value if its associated data item has not been decoded due to corruption or if said associated data item is predicted with reference to a reference data item that has not been decoded due to corruption, and to a second value otherwise, computing a corruption metric based on the binary values, and, in response to the metric value, encoding data items following a current data item without reference to a reference data item.

2. A method as claimed in claim 1, wherein the corruption metric is the ratio of binary values having the first value over the total number of binary values.

3. A device for determining a corruption indication of a sequence of encoded data frames distributed over a network, said data frames being encoded according to a predictive block-based encoding technique, said device comprising: a decoder for decoding the sequence of encoded data frames so as to obtain a sequence of decoded data frames, means for building a reliability map including binary values based on the decoding step, a binary value being associated with a decoded data item in such a way that the binary value is equal to a first value if its associated data item has not been decoded due to corruption or if said associated data item is predicted with reference to a reference data item that has not been decoded due to corruption, and to a second value otherwise, means for computing a corruption metric based on the binary values, and an encoder which, in response to the metric value, encodes data items following a current data item without reference to a reference data item.

4. A mobile apparatus comprising a device as claimed in claim 3.

5. A computer program product comprising program instructions for implementing, when said program is executed by a processor, a method as claimed in claim 1.

* * * * *